United States Patent
Kolman et al.

(10) Patent No.: US 9,560,027 B1
(45) Date of Patent: Jan. 31, 2017

(54) USER AUTHENTICATION

(71) Applicant: EMC Corporation, Hopkinton, MA (US)

(72) Inventors: Eyal Kolman, Tel Aviv, IL (US); Alon Kaufman, Bnei-Dror (IL); Yael Villa, Tel Aviv (IL); Alex Vaystikh, Hod Hasharon (IL); Ereli Eran, Tel Aviv (IL); Liron Liptz, Herzelia (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 13/852,187

(22) Filed: Mar. 28, 2013

(51) Int. Cl.
*G06Q 40/02* (2012.01)
*H04L 29/06* (2006.01)

(52) U.S. Cl.
CPC .................................. *H04L 63/08* (2013.01)

(58) Field of Classification Search
CPC ............ G06F 2221/2111; H04L 63/107; H04L 9/0872; H04L 63/08
See application file for complete search history.

(56) References Cited

U.S. PATENT DOCUMENTS

| | | | | |
|---|---|---|---|---|
| 5,757,916 A * | 5/1998 | MacDoran et al. | .......... | 380/258 |
| 7,986,816 B1 * | 7/2011 | Hoanca | .............. | G06K 9/00597 382/115 |
| 8,051,468 B2 * | 11/2011 | Davis | .............. | G06F 21/32 713/186 |
| 8,161,530 B2 * | 4/2012 | Meehan | .............. | G06Q 20/341 713/186 |
| 8,220,034 B2 * | 7/2012 | Hahn et al. | .......... | 726/5 |
| 8,800,027 B1 * | 8/2014 | Ackerman | .......... | 726/17 |
| 2003/0159066 A1 * | 8/2003 | Staw et al. | .......... | 713/201 |
| 2005/0076230 A1 * | 4/2005 | Redenbaugh et al. | .......... | 713/200 |
| 2007/0038568 A1 * | 2/2007 | Greene et al. | .......... | 705/50 |
| 2007/0061273 A1 * | 3/2007 | Greene et al. | .......... | 705/80 |
| 2007/0073630 A1 * | 3/2007 | Greene et al. | .......... | 705/80 |
| 2008/0010678 A1 * | 1/2008 | Burdette et al. | .......... | 726/15 |
| 2008/0033637 A1 * | 2/2008 | Kuhlman et al. | .......... | 701/202 |
| 2008/0091639 A1 * | 4/2008 | Davis | .......... | G06Q 30/02 |
| 2008/0167049 A1 * | 7/2008 | Karr | .......... | G01S 1/026 455/456.2 |
| 2008/0209543 A1 * | 8/2008 | Aaron | .......... | 726/17 |
| 2009/0049544 A1 * | 2/2009 | Kashi | .......... | 726/19 |
| 2009/0158404 A1 * | 6/2009 | Hahn et al. | .......... | 726/5 |
| 2010/0223663 A1 * | 9/2010 | Morimoto et al. | .......... | 726/7 |
| 2010/0325411 A1 * | 12/2010 | Jung et al. | .......... | 713/100 |
| 2012/0079588 A1 * | 3/2012 | Aaron | .......... | 726/17 |
| 2012/0233658 A1 * | 9/2012 | Piersol | .......... | 726/2 |
| 2013/0097673 A1 * | 4/2013 | Meehan | .......... | G06Q 20/341 726/4 |

(Continued)

*Primary Examiner* — Taghi Arani
*Assistant Examiner* — Sharon Lynch
(74) *Attorney, Agent, or Firm* — Krishnendu Gupta; Jason A. Reyes

(57) ABSTRACT

There is disclosed some techniques for processing an authentication request. In one example, a method comprises the step of determining the velocity between authentication requests of a user associated with the requests. Additionally, the method determines the likelihood that a location associated with one of the requests is associated with the user location. Furthermore, the method generates an authentication result based on the likelihood that a location associated with one of the requests is associated with the user location.

12 Claims, 4 Drawing Sheets

(56) References Cited

U.S. PATENT DOCUMENTS

| | | | | |
|---|---|---|---|---|
| 2013/0110715 A1* | 5/2013 | Buchhop | | 705/42 |
| 2013/0281115 A1* | 10/2013 | Dupray et al. | | 455/456.1 |
| 2013/0326600 A1* | 12/2013 | Sorek | | 726/6 |
| 2014/0115707 A1* | 4/2014 | Bailey, Jr. | | H04L 63/0861 |
| | | | | 726/25 |
| 2014/0237574 A1* | 8/2014 | Aaron | | 726/7 |
| 2015/0135326 A1* | 5/2015 | Bailey, Jr. | | G06F 21/577 |
| | | | | 726/25 |
| 2016/0197902 A1* | 7/2016 | Tunnell | | G06F 21/00 |
| | | | | 713/168 |

* cited by examiner

USER AUTHENTICATION

TECHNICAL FIELD

The present invention relates generally to user authentication, and more particularly to processing an authentication request.

BACKGROUND OF THE INVENTION

Some service providers use conventional risk-based authentication systems to assess a risk of processing customer transactions. For example, an online bank may employ a risk engine of such a risk-based authentication system to assign risk scores to banking transactions where higher risk scores indicate higher risk.

In generating a risk score, the risk score engine can take as input values of various transaction attributes (e.g., geolocation). For each user, there is an associated history based on values of the attributes associated with previous transactions involving that user. The risk engine incorporates the history associated with the user into an evaluation of the risk score. Significant variation of one or more attribute values from those in the user's history may signify that the transaction has a high risk.

It will be understood that in some approaches the velocity of the user between transactions can be used as the input to determine the risk of the user. For example, a user cannot be in two distant places at the same time. Hence, whenever an input of the user location is received, it is used together with the former reported location to estimate the user's velocity. If the velocity of the user between the two transactions is too high, it may be that one of the locations is associated with an attacker trying to impersonate the user and a high risk score is generated.

Unfortunately, there are deficiencies with the above approaches to determining risk. For example, the problem with using the velocity of the user as an input to determine risk is that in many cases the location associated with the user is not correct. It may be the case that the location is estimated correctly but is not the user location leading to wrong velocity estimation and false alarms. For example, a user may connect remotely to a mobile network and log in through a VPN connection resulting in the user location being indicated as the location of the network provider even though the user may be anywhere in the globe. In another case, a user can have two devices, each reporting distant locations such as a mobile IP-geolocation reporting Boston while a PC reports London.

The present invention aims to overcome at least some of the above problems associated with prior risk-based authentication systems.

SUMMARY OF THE INVENTION

There is disclosed a computer-implemented method for processing an authentication request, the method comprising: receiving a first authentication request from a user, wherein the first authentication request includes a first timestamp and first location data; receiving, after the first authentication request, a second authentication request from the user, wherein the second authentication request includes a second timestamp and second location data; based on the first and second authentication requests, determining the velocity between the first and second authentication requests of the user associated with the requests; determining that the velocity of the user exceeds a velocity threshold; determining the likelihood that the second location is associated with the user location; and generating an authentication result based on the likelihood that the second location is associated with the user location.

There is also disclosed a system constructed and arranged for processing an authentication request, the system comprising: a network interface; a memory; and a controller which includes controlling circuitry coupled to the memory, the controlling circuitry being constructed and arranged to: receive a first authentication request from a user, wherein the first authentication request includes a first timestamp and first location data; receive, after the first authentication request, a second authentication request from the user, wherein the second authentication request includes a second timestamp and second location data; based on the first and second authentication requests, determine the velocity between the first and second authentication requests of the user associated with the requests; determine that the velocity of the user exceeds a velocity threshold; determine the likelihood that the second location is associated with the user location; and generate an authentication result based on the likelihood that the second location is associated with the user location.

There is further disclosed a computer program product having a non-transitory, computer-readable storage medium which stores code to process an authentication request, the code including instructions to: receive a first authentication request from a user, wherein the first authentication request includes a first timestamp and first location data; receive, after the first authentication request, a second authentication request from the user, wherein the second authentication request includes a second timestamp and second location data; based on the first and second authentication requests, determine the velocity between the first and second authentication requests of the user associated with the requests; determine that the velocity of the user exceeds a velocity threshold; determine the likelihood that the second location is associated with the user location; and generate an authentication result based on the likelihood that the second location is associated with the user location.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

The invention can be implemented in numerous ways, including as a process, an apparatus, a system, a computer program embodied on a computer readable storage medium, and/or a processor, such as a processor configured to execute instructions stored on and/or provided by a memory coupled to the processor. In this specification, the implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

Figure 1:
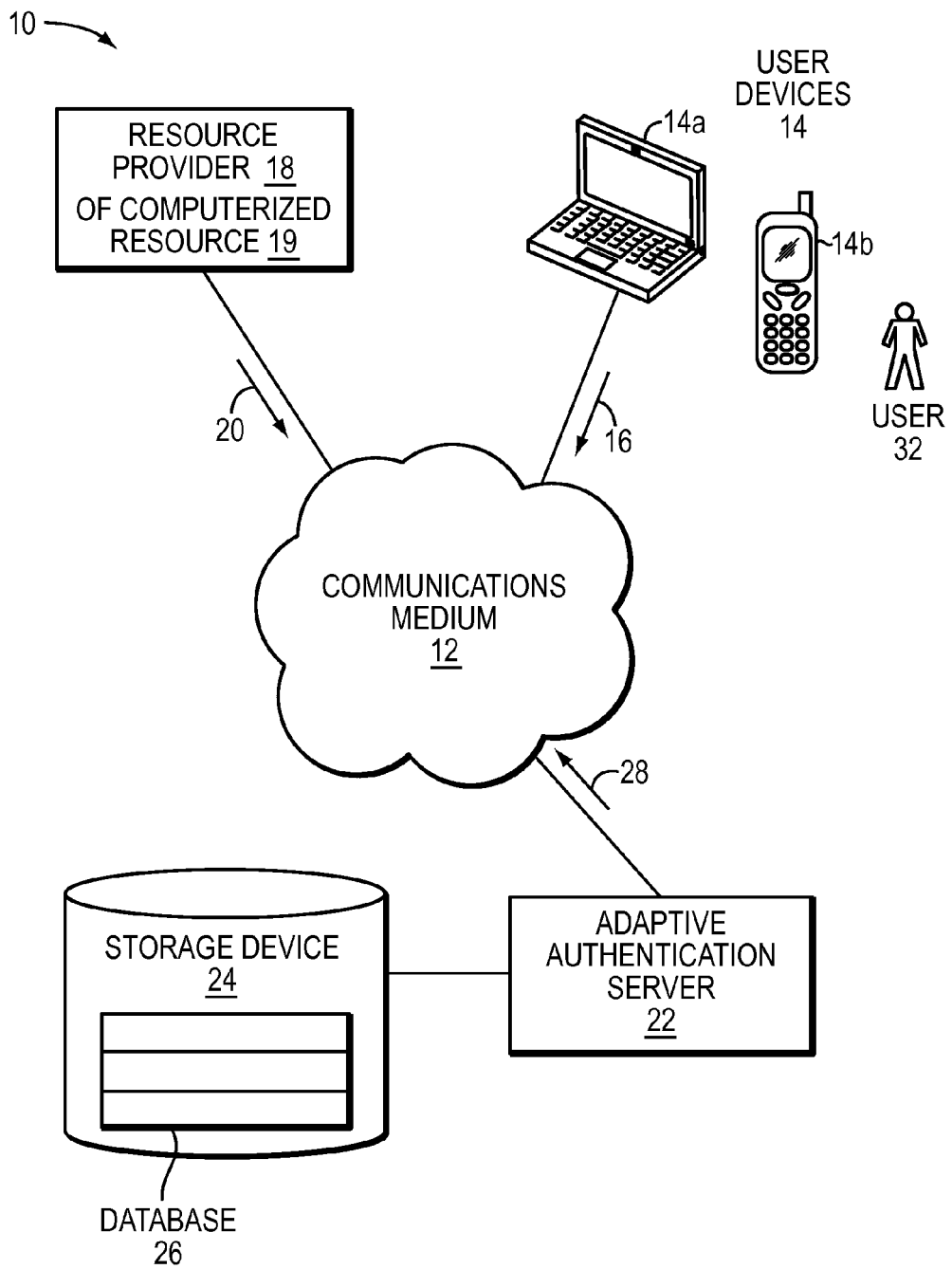
FIG. 1 is a schematic diagram illustrating an electronic environment for carrying out the improved technique.

Referring to FIG. 1, there is illustrated an electronic environment 10 for carrying out the improved technique. Electronic environment 10 includes communications medium 12, user devices 14, resource provider 18, and adaptive authentication server 22.

Communication medium 12 provides network connections between user devices 14, resource provider 18, and adaptive authentication server 22. Communications medium 12 may implement a variety of protocols such as TCP/IP, UDP, ATM, Ethernet, Fibre Channel, combinations thereof, and the like. Furthermore, communications media 12 may include various components (e.g., cables, switches/routers, gateways/bridges, NAS/SAN appliances/nodes, interfaces, etc.). Moreover, the communications medium 12 are capable of having a variety of topologies (e.g., queue manager-and-spoke, ring, backbone, multi drop, point to-point, irregular, combinations thereof, and so on).

User devices 14 include smartphones, personal digital assistants, laptop computers, desktop computers, tablet computers, and the like constructed and arranged to submit transaction request 16 to resource provider 18 via communications medium 12.

Resource provider 18 is constructed and arranged to receive transaction 16 from user device 14 via communications medium 12. Resource provider 18 is also constructed and arranged to obtain geolocation data and timestamp from the transaction request 16. Resource provider 18 is constructed and arranged to send transaction 20 to adaptive authentication server 22 via communications medium 12. Resource provider 18 is further constructed and arranged to receive adaptive authentication result 28 from adaptive authentication server 22.

Adaptive authentication server 22 is constructed and arranged to receive transaction 20 from resource provider 18 over communications medium 12. Adaptive authentication server 22 is also constructed and arranged to access transaction data in database 26 stored on storage device 24. Adaptive authentication server 22 is further constructed and arranged to send adaptive authentication results 28 to resource provider 18.

During operation, a user 32 on user device 14 submits a transaction request 16 under a user identifier to resource provider 18 via communications medium 12. The transaction request 16 submitted by the user device 14 enables the resource provider 18 to acquire from the transaction request 16 the time of transaction 16 and geolocation information for user device 14. For example, the resource provider 18 can derive the geolocation information from an IP address associated with the user device 14. Once the geolocation information and time is obtained, the resource provider 18 sends transaction 20 to adaptive authentication server 22 in order to obtain authentication results concerning user 32.

Upon receiving the transaction 20, the adaptive authentication server 22 searches transaction 20 for geolocation information and time. The adaptive authentication server 22 also accesses database 26 to locate an entry for the previous transaction associated with the user identifier which comprises similar information to the transaction 20 (i.e., geolocation information and time). Based on the transaction 20 and the previous transaction, the adaptive authentication server 22 determines the velocity of the user between the respective transactions.

The adaptive authentication server 22 then determines if the velocity of the user exceeds a velocity threshold. If the velocity exceeds the threshold, the authentication server 22 determines the likelihood of the geolocation associated with the transaction 20 being associated with the user location. The server 22 determines the likelihood by first obtaining from the database 26 entries of all previous transactions associated with the user. If the entries for the previous transactions include geolocation information that does not have any relationship with the geolocation associated with the transaction 20, the server 22 will determine that there is a likelihood that the geolocation associated with the transaction 20 is not associated with the user location. If the entries for the previous transactions include geolocation information that relates with the geolocation of the transaction 20, there is likelihood that the geolocation information associated with transaction 20 is associated with the user location. It should be appreciated that the greater the number of previous transactions that include geolocation information that relate with the geolocation associated with the transaction 20, the greater the likelihood that the geolocation associated with transaction 20 is associated with the user location. The adaptive authentication server 22 finally generates an authentication result 28 based on the likelihood that the geolocation associated with transaction 20 is associated with the user location.

In some arrangements, adaptive authentication server 22 obtains information concerning the previous transactions from database 26 stored on storage device 24. Database 26 contains a set of entries, each entry being associated with a transaction. Each entry includes values of attributes of the associated transaction. One of these attributes corresponds to the geolocation of the user device that sent the transaction. Another relates to the time of the transaction. In generating authentication result 28, adaptive authentication server 22 accesses database 26 and locates entries of previous transactions associated with the user identifier. Adaptive authentication server 22 then reads the values from the previous transactions obtained from database 26.

After generating authentication result 28, adaptive authentication server 22 sends authentication result 28 to resource provider 18 over communications medium 12. Based on authentication result 28, resource provider 18 can process transaction 20, cancel transaction 20, or request additional information from user 32.

It should be understood that in this embodiment the resource provider 18 can provide each user device 14 with access to one or more computerized resources 19 following successful user authentication through that user device 14. An example of a suitable resource provider 18 is a data storage array which provides secure access to files, directories, volumes, LUNs, etc. Another example of a suitable resource provider 18 is a web server which provides secure access to various web pages. Yet another example of a suitable resource provider 18 is a server which provides secure user account and/or transactional access such as that for an online banking site, an online store, an online gaming site, and so on. Other types of resource providers are suitable for use as well.

Figure 2:
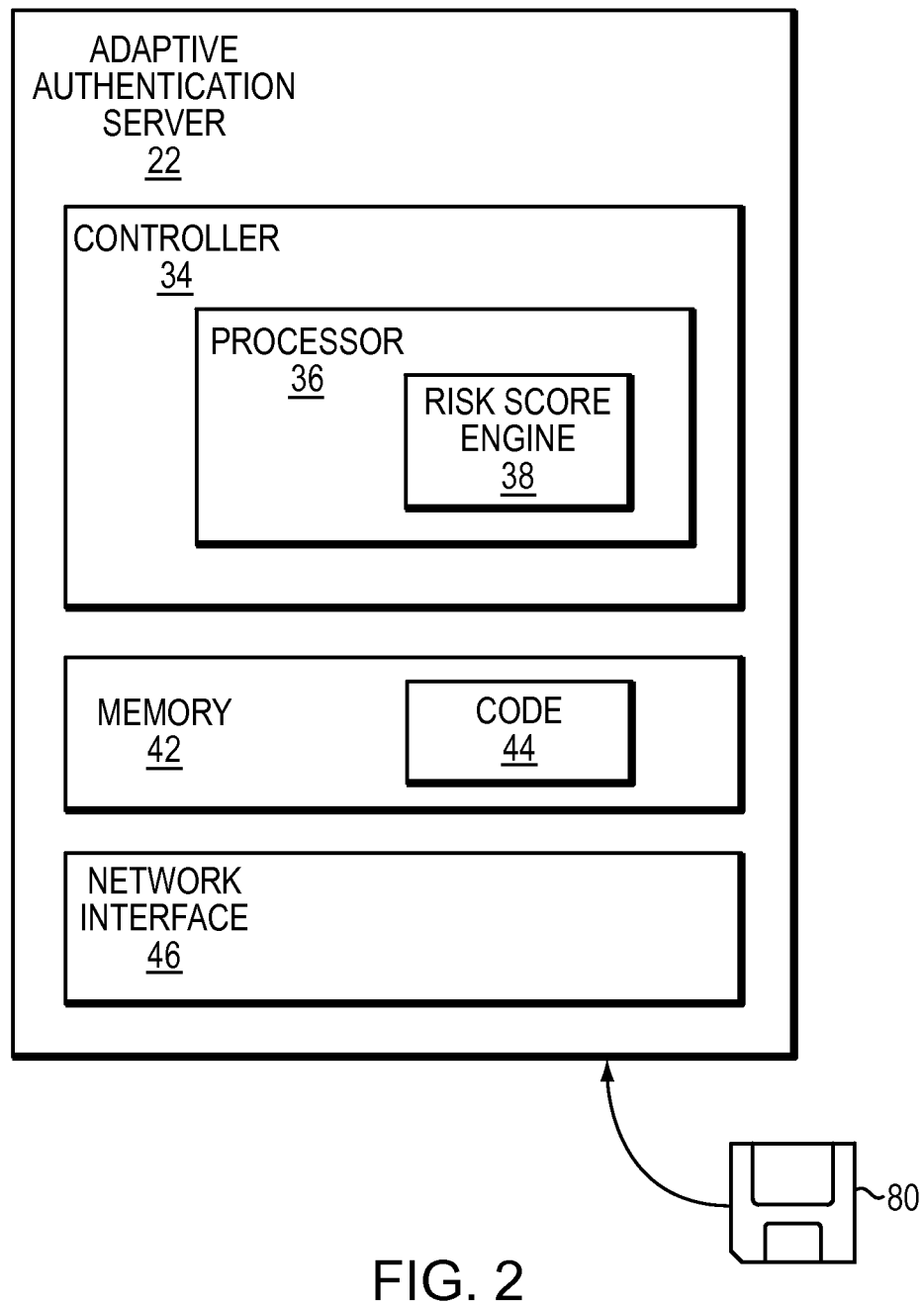
FIG. 2 is a schematic diagram illustrating the adaptive authentication engine within the electronic environment shown in FIG. 1.

Further details concerning adaptive authentication server 22 are considered with respect to FIG. 2.

Referring to FIG. 2, there is illustrated some components of adaptive authentication server 22. Adaptive authentication server 22 includes a controller 34, which in turn includes processor 36, a memory 42 and a network interface 46.

Memory 42 is configured to store code which includes code 44 constructed and arranged to identify risky transactions. Memory 42 is further configured to store transaction 20 received from resource provider 18. Memory 42 generally takes the form of, e.g., random access memory, flash memory or a non-volatile memory.

Processor 36 takes the form of, but is not limited to, Intel or AMD-based MPUs, and can include a single or multi-cores each running single or multiple threads. Processor 36 is coupled to memory 42 and is configured to execute instructions from code 44 stored in memory 42. Processor 36 includes risk score engine 38.

Risk score engine 38 is constructed and arranged to assign a risk score to a transaction based on values of attributes of previous transactions and transaction 20 stored in memory 42.

Network interface 46 is constructed and arranged to send and receive data over communications medium 12. Specifically, network interface 46 is configured to receive transaction 20 from resource provider 18 over communications medium 12 and to send transaction result 28 to resource provider 18 over communications medium 12. Also, network interface 46 is constructed and arranged to receive data from storage device 24.

During operation, network interface receives transaction 20. Upon the receipt, processor 36 stores its attribute values, including the time and geolocation information, in memory 42. Risk score engine 38 then executes instructions derived from code 44 to access these attribute values from memory 42 and assigns a risk score to transaction 20. In some arrangements, the risk score is based on a set of Bayesian weights, each of which corresponds to an attribute associated with transaction 20. Risk score engine 38 derives the value of each Bayesian weight from values of the attribute to which the Bayesian weight corresponds for previous transactions which are stored in database 26.

In some arrangements, processor 36 sends a command to perform a lookup operation on database 26 to storage device 24 via network interface 46. In some arrangements, the lookup operation is configured to return previous transactions associated with the customer's user identifier. Processor 36 determines the velocity of the user between transactions. Processor also determines if the velocity exceeds the velocity threshold. Processor 36 further identifies those previous transactions that have a similar geolocation to that for transaction 20; processor 36 then computes the percentage of previous transactions that processor 36 identifies as having such a geolocation. Risk score engine 38 then accesses this percentage for use in assigning a risk score to transaction 20.

Once risk score engine 38 assigns a risk score to transaction 20, network interface sends the risk score in the form of authentication result 28 to resource provider 18 via communications medium 12.

Figure 3:
FIG. 3 is a schematic diagram illustrating a portion of the database stored in the storage device shown in FIG. 1.

Further details of this additional information is managed and used are shown with regard to FIG. 3.

Referring to FIG. 3, there is illustrated an example of a portion 100 of database 26 stored in storage device 24. Portion 100 includes a set of entries corresponding to transactions associated with username A. Beside the username field 110, fields of database 26 include geolocation 120, IP address 130, date 140 of transaction, and time 150 of transaction.

First, suppose that the transactions 161 to 165 are the previous transactions which occur within an eighteen hour period with the geolocations of the respective transactions ranging from Israel to the United States. The current transaction 166 is received two hours after the previous transaction 165. The location data 130 associated with the transaction 166 indicates that it originates in New York.

As described else ware herein, the server 22 obtains the previous transaction 165 in response to receiving the transaction 166. The server 22 will determine the velocity of the user between the transactions 165 and 166. It should be appreciated that the velocity will be high as the data indicates that the user travelled between Jerusalem and New York in a two hour period. Assuming the determined velocity exceeds the threshold, the server 22 will access the previous transactions 161 to 164 with a view of determining the likelihood that the location associated with transaction 166 is associated with the user location. In this example, the transaction 162 was received the previous day with similar location characteristics as the transaction 166. The server 22 is configured such that the likelihood of the location of the transaction 166 being associated with the user location is higher due to a historical transaction having a similar location. The server 22 subsequently generates an authentication result based on the likelihood. The authentication result includes a risk score which indicates the likelihood that the transaction 166 is risky. In this example, the risk score will not be as high as it would have been without the similar transaction 162.

Figure 4:
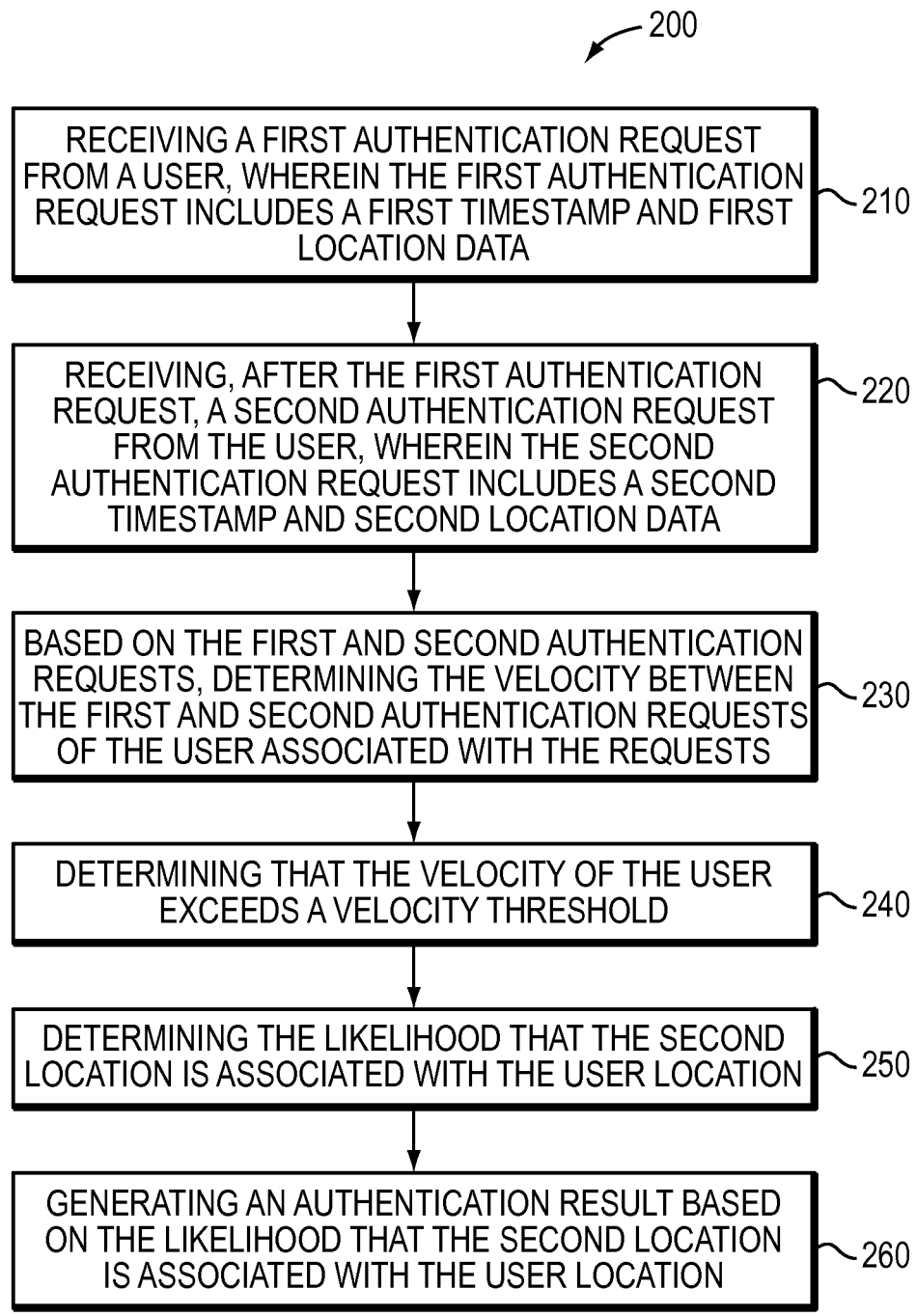
FIG. 4 is a flow chart illustrating a method of carrying out the improved technique within the electronic environment shown in FIG. 1.

Referring to FIG. 4, there is illustrated a flow chart of a method 200 that may be used in connection with techniques described herein. The exemplary method 200 can be used for processing an authentication request. In the flow diagram, the operations are summarized in individual blocks. The operations may be performed in hardware, or as processor-executable instructions that may be executed by a processor. Furthermore, the method 200 may, but need not necessarily, be implemented using the adaptive authentication server as illustrated in FIGS. 1 and 2.

At steps 210 and 220, the method receives first and second authentication requests from a user. The first and second authentication requests include respective timestamps and location data. The location data represents the respective locations of a user device generating the first and second authentication requests. For example, the location data of the first and second authentication requests can represent the respective IP addresses associated with a user device that generates the authentication requests.

At step 230, the method determines the velocity between the first and second authentication requests of the user associated with the requests based on the first and second authentication requests. For example, the IP addresses can be translated to locations corresponding to a single point on the Earth's surface for enabling the distance to be determined between the locations. The calculation of the distance together with the respective timestamps of the first and second authentication requests can facilitate the determination of the velocity of the user between the first and second authentication requests.

At step 240, the method determines that the velocity of the user exceeds a velocity threshold. It should be appreciated that the threshold can be selectable. For example, the velocity threshold can be set such that a velocity in excess of a viable velocity will exceed the threshold.

At steps 250 and 260, the method determines the likelihood that the second location is associated with the user location and generates an authentication result based on the likelihood that the second location is associated with the user location. The likelihood that the second location is associated with the user location is dependent on historical authentication requests including the first authentication request Advantageously, the method enables the probability of an alert to be determined per each location. More formally, given a location with some attribute $attribute_i$ having a value $value_j$, the method determines the probability of the location generating an alert $P(Alert|attribute_i=value)$.

In many cases the alert is part of a multivariate authentication system, a feedback might be available describing whether the alarm was true in which an attacker impersonating to be the genuine user or false if it was the user itself. Then, this feedback can be used to distinguish between a true alarm and false alarm, and the posterior probability to be calculated is $P(False\ Alert|attribute_i=value_j)$ instead of the general $P(Alert|attribute_i=value_j)$.

It should be appreciated that values that have high probability to generate alarms are likely to be values that are connected to location errors. These values are automatically written into storage. When a new alert is generated, its values are compared with this list, and if they appear in it there is a higher probability that the alert is a false alarm caused by location error. In that case, the alert can be removed or de-prioritize. The de-prioritization can be applied by multiplying score by a factor:

$$Score_{NEW}=Score_{OLD} \times Factor(P)$$

where P is the posterior probability for an alert given the event attributes (or when tagging is available through feedback, the posterior probability of a false alert). The factor, as a function of P should satisfy the following characteristics:
1. $Factor(P) \geq 0$ for all P and Factor (1)=0
2. $Factor(P) \leq 1$ for all P and Factor (0)=1
3. $P_1 > P_2 \rightarrow Factor(P_1) < Factor(P_2)$ An example for an appropriate factor function is:

$$Factor(P) = \frac{\exp(-P) - \exp(-1)}{1 - \exp(-1)}$$

While various embodiments of the invention have been particularly shown and described, it will be understood by those skilled in the art that various changes in form and details may be made therein without departing from the spirit and scope of the invention as defined by the appended claims.

It should be understood that some embodiments are directed to adaptive authentication server 22 which is constructed and arranged to process authentication requests and identify risky transactions. Some embodiments are directed to adaptive authentication server 22. Some embodiments are directed to a system which processes authentication requests and identify risky transactions. Some embodiments are directed to a process of processing authentications requests and identify risky transactions. Also, some embodiments are directed to a computer program product which enables computer logic to process authentication requests and identify risky transactions.

In some arrangements, adaptive authentication server 22 is implemented by a set of processors or other types of control/processing circuitry running software. In such arrangements, the software instructions can be delivered to adaptive authentication server 22 in the form of a computer program product 80 (FIG. 2) having a computer readable storage medium which stores the instructions in a non-volatile manner. Alternative examples of suitable computer readable storage media include tangible articles of manufacture and apparatus such as CD-ROM, flash memory, disk memory, tape memory, and the like.

What is claimed is:

1. A computer-implemented method, comprising:
receiving a first electronic transaction from a user seeking access to a computerized resource, wherein the first electronic transaction describes a first time and a first location;
receiving, after the first electronic transaction, a second electronic transaction from the user seeking access to the computerized resource, wherein the second electronic transaction describes a second time and a second location;
based on the first and the second electronic transactions, determining a purported velocity of the user between the first and the second electronic transactions;
based on the purported velocity, determining a risk score in connection with the second electronic transaction, wherein the risk score is an indicator of an alert scenario in connection with the second electronic transaction;
accessing historical electronic transactions to determine a posterior probability factor based on a posterior probability of a false alert being generated indicating location error when an electronic transaction describes the second location; and
based on a new risk score, determining whether to provide the user with access to the computerized resource, wherein determining whether to provide the user with access includes performing a mathematical computation to generate the new risk score, whereby the risk score and the posterior probability factor are inputs to the mathematical computation, such that the alert scenario associated with the risk score is removed or deprioritized when the posterior probability is high.

2. The method as claimed in claim 1, wherein the first location and the second location represent respective first and second locations of a user device generating the first and the second electronic transactions.

3. The method as claimed in claim 1, wherein the first location and the second location of the first and the second electronic transactions represent respective IP addresses associated with a user device generating the first and the second electronic transactions.

4. The method as claimed in claim 3, wherein the IP addresses are translated to locations corresponding to points on the surface of the earth for enabling a distance to be determined between the first and the second locations, the distance together with the first time and the second time facilitating determining the purported velocity of the user between the first and the second electronic transactions.

5. A system, comprising:
a network interface;
a memory; and a controller which includes controlling circuitry coupled to the memory, the controlling circuitry being constructed and arranged to:

receive a first electronic transaction from a user seeking access to a computerized resource, wherein the first electronic transaction describes a first time and a first location;

receive, after the first electronic transaction, a second electronic transaction from the user seeking access to the computerized resource, wherein the second electronic transaction describes a second time and a second location;

based on the first and the second electronic transactions, determine a purported velocity of the user between the first and the second electronic transactions;

based on the purported velocity, determine a risk score in connection with the second electronic transaction, wherein the risk score is an indicator of an alert scenario in connection with the second electronic transaction;

access historical electronic transactions to determine a posterior probability factor-based on a posterior probability of a false alert being generated indicating location error when an electronic transaction describes the second location; and based on a new risk score, determine whether to provide the user with access to the computerized resource, wherein determining whether to provide the user with access includes performing a mathematical computation to generate the new risk score, whereby the risk score and the posterior probability factor are inputs to the mathematical computation, such that the alert scenario associated with the risk score is removed or deprioritized when the posterior probability is high.

6. The system as claimed in claim 5, wherein the first location and the second location represent respective first and second locations of a user device generating the first and the second electronic transactions.

7. The system as claimed in claim 5, wherein the first location and the second location of the first and the second electronic transactions represent respective IP addresses associated with a user device generating the first and the second electronic transactions.

8. The system as claimed in claim 7, wherein the IP addresses are translated to locations corresponding to points on the surface of the earth for enabling a distance to be determined between the first and the second locations, the distance together with the first time and the second time facilitating determining the purported velocity of the user between the first and the second electronic transactions.

9. A computer program product having a non-transitory, computer-readable storage medium which stores code, the code including instructions to:

receive a first electronic transaction from a user seeking access to a computerized resource, wherein the first electronic transaction describes a first time and a first location;

receive, after the first electronic transaction, a second electronic transaction from the user seeking access to the computerized resource, wherein the second electronic transaction describes a second time and a second location;

based on the first and the second electronic transactions, determine a purported velocity of the user between the first and the second electronic transactions;

based on the purported velocity, determine a risk score in connection with the second electronic transaction, wherein the risk score is an indicator of an alert scenario in connection with the second electronic transaction;

access historical electronic transactions to determine a posterior probability factor-based on a posterior probability of a false alert being generated indicating location error when an electronic transaction describes the second location; and based on a new risk score, determine whether to provide the user with access to the computerized resource, wherein determining whether to provide the user with access includes performing a mathematical computation to generate the new risk score, whereby the risk score and the posterior probability factor are inputs to the mathematical computation, such that the alert scenario associated with the risk score is removed or deprioritized when the posterior probability is high.

10. The computer program product as claimed in claim 9, wherein the first location and the second location represent respective first and second locations of a user device generating the first and the second electronic transactions.

11. The computer program product as claimed in claim 9, wherein the first location and the second location of the first and the second electronic transactions represent respective IP addresses associated with a user device generating the first and the second electronic transactions.

12. The computer program product as claimed in claim 11, wherein the IP addresses are translated to locations corresponding to points on the surface of the earth for enabling a distance to be determined between the first and the second locations, the distance together with the first time and the second time facilitating determining the purported velocity of the user between the first and the second electronic transactions.

* * * * *